United States Patent [19]

Sewell et al.

[11] Patent Number: 5,451,239
[45] Date of Patent: Sep. 19, 1995

[54] ANIMAL DETERRENT DEVICES

[76] Inventors: Anthony J. Sewell, 27 Verulam, Walthamstow London E17 8ES; Joseph Fadil, 20 Park Road, Walthamstow London E17, both of England

[21] Appl. No.: 53,167

[22] Filed: Apr. 26, 1993

[30]   Foreign Application Priority Data

Sep. 12, 1992 [GB]   United Kingdom ................. 9219399

[51] Int. Cl.⁶ ............................................. A01K 3/00
[52] U.S. Cl. ..................................... 47/1.01; 52/101; 47/25; 256/1
[58] Field of Search ..................... 47/1.01, 25; 52/101; 404/35, 36; 428/15, 17, 255; 411/458, 459, 460, 468; 156/1

[56]   References Cited

U.S. PATENT DOCUMENTS

| | | | |
|---|---|---|---|
| 324,649 | 8/1885 | Brown | 404/35 |
| 1,585,503 | 5/1926 | Larsen | 52/101 |
| 2,099,273 | 11/1937 | Myer | 411/460 |
| 2,142,371 | 1/1939 | Peles | 52/101 |
| 2,306,080 | 12/1942 | Peles | 52/101 |
| 2,899,775 | 8/1959 | Partin | 404/36 |
| 3,407,550 | 10/1968 | Shaw | 52/101 |
| 4,596,731 | 6/1986 | Cadmore | 404/36 |

FOREIGN PATENT DOCUMENTS

| | | | |
|---|---|---|---|
| 340108 | 11/1989 | European Pat. Off. | 52/101 |
| 3915553 | 8/1990 | Germany | 52/101 |
| 5461080 | 4/1979 | Japan | 52/101 |
| 2049857 | 2/1980 | United Kingdom | 411/458 |
| 2249013 | 4/1992 | United Kingdom | 52/101 |

Primary Examiner—Henry E. Raduazo
Attorney, Agent, or Firm—Bauer & Schaffer

[57]   ABSTRACT

An animal deterrent device is disclosed which comprises an open lattice or grid of moulded low density polythene and having flexible spike formations projecting therefrom approximately normally thereto. The device is placable on the ground to cause discomfort to animals from stepping on them and thereby deter animals from the area protected by the device. In one embodiment the device is fixable in the ground by ones of said flexible spike formations entering into the ground, and in a second embodiment the device is fixable in the ground by means of anchor members normally lying in the plane of the device but which may be bent out of the plane of the device to extend to one side of the lattice or grid. The anchor members are in the form of broad arrows having triangular or barbed ends which act firmly to hold the device in a position in which it is placed.

12 Claims, 2 Drawing Sheets

ANIMAL DETERRENT DEVICES

DESCRIPTION

The invention relates to animal deterrent devices, and in particular devices for deterring feral and domestic animals approaching areas protected by the devices.

The fouling of gardens by cats, dogs and foxes is a common problem—especially in view of the increasing laxity of owners in preventing their pets causing nuisance and/or annoyance to their neighbors.

Cats are difficult to train to defecate in a particular place or area and their instinctive desire to bury their faeces often leads them to destroy or severely disturb seed, vegetable and flower beds.

Cats in particular are drawn to newly turned ground for the purpose of defecation which adds significantly to the problem and to gardeners annoyance.

Additionally, the natural inquisitiveness of cats, dogs and foxes will cause them to investigate any newly turned soil disturbing any seeds or seedlings which have been planted there.

Various methods of deterring animals from approaching protected area have been proposed and include, for example, the application of an irritant powder or a material which has an unpleasant odor.

Neither or these methods are thought to be environmentally friendly and both are, in any event, thought to be ineffective and demanding in requiring continual application of the powder or the material to the area being protected.

Another suggestion which has been promoted recently includes the placement of a number of partially liquid filled transparent bottles around an area being protected. The efficacy of this solution in deterring domestic and feral animals from approaching a protected area has not, to our knowledge, yet been proved and clearly this proposal is visually intrusive.

An object of the present invention is to provide a device which will deter feral and domestic animals from approaching an area, and in particular approaching and defecating upon an area in which newly planted seeds or plants are located.

A second object of the invention is to provide a device which will deter feral and domestic animals from approaching an area and which is additionally environmentally inert and visually unobtrusive when in use.

In one aspect the invention provides an animal deterrent device which comprises a moulded plastics open lattice or grid lying generally in a plane and having a plurality of spike formations projecting generally normally of the plane.

The lattice or grid may comprise a first plurality of spaced elongate members which intersect a second plurality of spaced elongate members, which elongate members undulate irregularly or are sinuous and are not parallel to each other within either the first or the second plurality.

Preferably the spike formations project from the interstices of the elongate members, and may project from both sides of the lattice or grid.

In one arrangement embodying the invention spike formations projecting from one side of the lattice or grid are longer than the spike formations projecting from the other side of the lattice or grid.

In this arrangement the longer spike formations projecting from said one side of the grid are provided at some of the interstices of said lattice or grid whilst said shorter spike formations provided on the other side of the grid are provided at all the interstices of the lattice or grid.

In another arrangement embodying the invention the device is provided with at least one anchor member which extends in use from one side of the lattice or grid whilst said spike formations extend from the other side of said lattice or grid.

In this arrangement the or each anchor member is longer than the spike formations carried by the lattice or grid, preferably three times or more longer than those spike formations.

The or each anchor member is desirably provided with a triangular or barbed head.

The or each anchor member may be formed to extend from parts of ones of said first or said second pluralities of elongate members.

The length of the or each anchor member is preferably greater than the spacing of individual ones of said first or said second pluralities of members.

Desirably the or each anchor member is attached to parts of ones of said first or said second pluralities of members by means of a hinge formation.

The or each said anchor member may be provided in the form of a broad arrow side edges of which are in the form of beads interconnected by a central web thinner than said beads.

The hinge formation preferably comprises notches formed in said bead adjacent said parts of ones of said first and second members to which the or each anchor member is attached.

With advantage the head of the or each anchor member tapers in thickness in passing away from the elongate lattice or grid member to which the anchor member is connected.

With particular advantage interstices occur at intervals at 1.00 to 4.00 cm along the length of an elongate member, preferably at intervals of 1.50 to 2.50 cm along the length of an elongate member.

Advantageously the said spike formations on said other side of the lattice or grid extend a distance of from 1.00 to 3.00 cm from the plane of the lattice or grid.

The vertices of the head may be connected to others of said first and second members by readily rupturable webs.

The above aspects, features and advantages of the present invention will become apparent from the following description of an embodiment thereof now made with reference to the accompanying drawing, in which.

Figure 1:
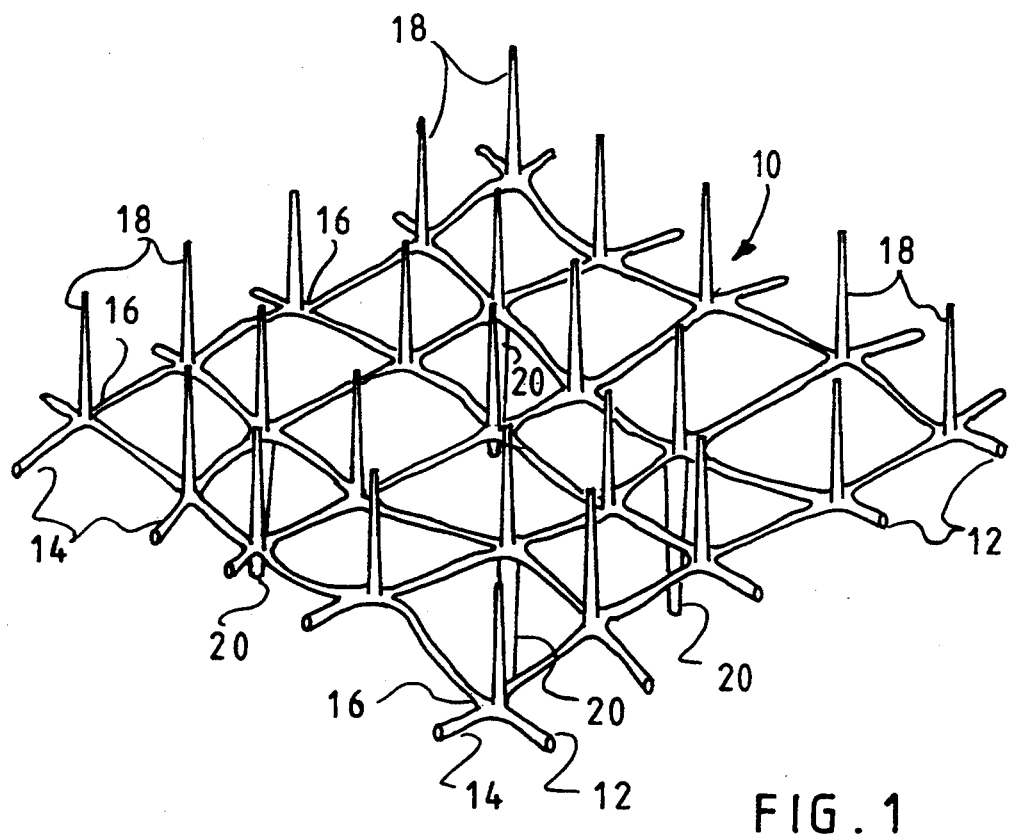
FIG. 1 is a pictorial view of an animal deterrent device embodying the invention.

FIG. 1 shows an animal deterrent device to comprise a moulded flexible plastics open grid or lattice 10. In the grid or lattice a first group or plurality of irregularly undulating or sinuous elongate members 12 intersect a second group or plurality of irregularly undulating or sinuous elongate members 14 at interstices 16. At each interstice the lattice or grid is formed with an integral spike formation 18 projecting generally normally of the grid or lattice to one side of the plane of the lattice or grid.

In other embodiments (not shown) the mat may, if not preferably, be formed of a regular lattice.

The spike formations 18 are sufficiently long and sharp to be uncomfortable for an animal, especially a cat, in the act of defecation. As an example the length of the illustrated spike formations 18 is approximately 2.00 cm. Spike formations having a height in the range of 1.00 to 3.00 cm are preferred to cause sufficient discomfort to discourage and deter animals from defecating on the device. The spike formations are spaced along the elongate members at the interstices 16 and the spacing between spike formations 18 varies (due to the irregularity of the elongate members 14 and 12) but approximately lies in the range of 1.50 to 2.50 cm. A range of 1.00 to 4.00 cm is preferred.

A lesser number of interstices are formed with downwardly oriented spike formations 20, four are illustrated in FIG. 1 against twenty five upwardly oriented spike formations 18. In larger devices (not illustrated) there may be one downwardly oriented spike formation 20 for, say, each nine upwardly oriented spike formations 18. In use the downwardly oriented spike formations 20 are pressed into the ground to locate the device preventing it from being blown from the position in which it is placed or scratched out of the way by, say, a cat.

Although the device illustrated in FIG. 1 is shown as a discrete square, it may be considered as part of a much larger device—embodiments of the invention provide that the device may be provided as a roll from which a length is cut to suit.

The deterrent device shown in the FIGS. 2 to 5, again comprises a lattice or grid formation comprising first and second groups or pluralities of elements 30 and 32 extending generally orthogonally one of the other and intersecting at a number of interstices 34. The elements 30 and 32 are again of an irregularly undulating or serpentine form as shown.

A plurality of upstanding spike formations 36 are provided at the interstices 34 of ones of first and second members 30 and 32.

Each of the spike formations 36 upstands from the lattice or grid to one side thereof by an amount approximately equal to the spacing of adjacent ones of the first and second members.

Figure 2:
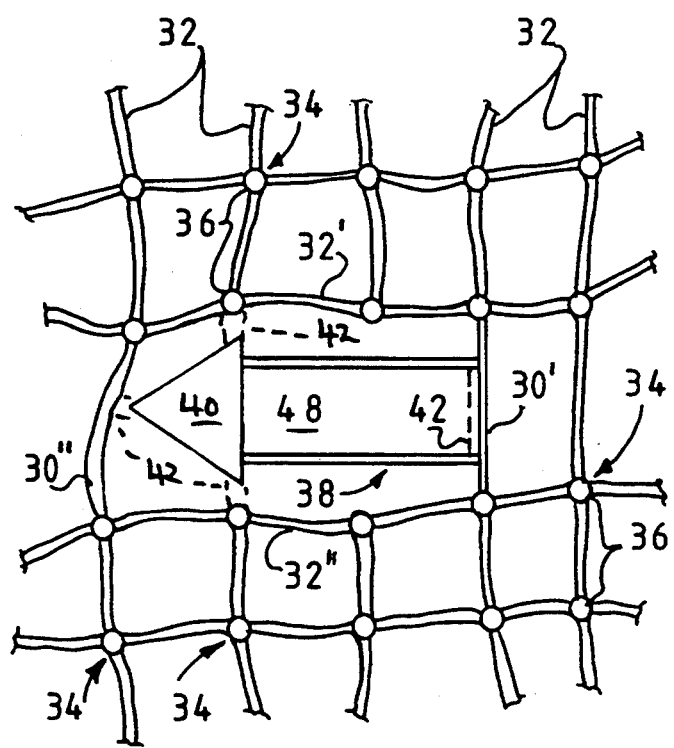
FIG. 2 is a plan view of a second device embodying the invention.

It will be seen, particularly from FIG. 2, that parts of a number of the first members 30 have been omitted and that in their place is provided an anchor member 38 attached to part 30' of one of the first members 30.

Anchor member 38 is generally of the form shown—that is to say in the form of a broad arrow extending from part 30' of 30 towards another member 30" and terminating in a triangular head 40.

Anchor member 38 is attached to the part 30' by a hinge formation 42 which will be described in more detail below and may be attached if desired to adjacent ones 32' and 32" of the members 32 and to the part 30" by readily rupturable webs shown in dotted outline (FIG. 2).

The deterrent device is moulded in the piece from any suitable plastics material—for example low density (polyethylene).

When it is desired to use the deterrent device shown in FIGS. 2 to 5 a user grasps it and pushes the head 40 of an anchor member 38 away from the plane of the lattice or grid to the side opposed to that on which the spike formations 36 are provided.

In doing this he will rupture the web connections 44, if they are provided between the head 40 of the anchor and the parts 30", 32' and 32".

The user will then further rotate anchor member 18 about hinge formation 42 until it adopts a position in which it extends substantially normally of the lattice or grid.

The user may then place the device where he wishes—on newly turned soil, or on a lawn, by pushing the head 40 of the or each anchor member 38 into the ground such that it is engaged and held by the soil. In this way it will be seen the device is held firmly in position with the spike formations 36 upstanding from the surface on which the device is placed.

Figure 4:
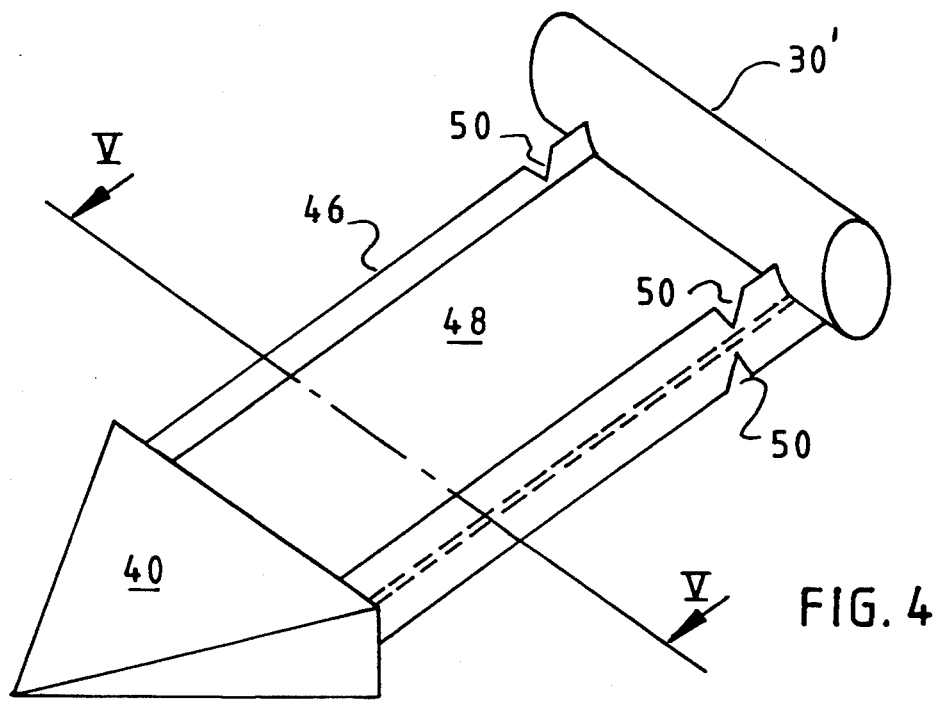
FIG. 4 is a detailed perspective view showing an anchor member of the device of FIG. 2.
Figure 5:
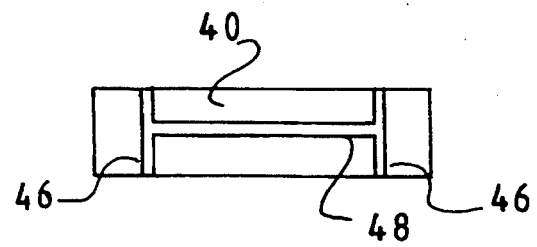
FIG. 5 is a sectional view of the anchor member shown in FIG. 4.

The anchor member's rigidity is increased—as can be seen particularly from FIGS. 4 and 5—by providing it with side edge beads 46 interconnected by a central web 48 which is substantially thinner. It will be appreciated that for the main part the anchor member 38 is in the form of a I-beam, although other shapes in section (e.g. a U or L shape) may be used if desired.

To increase the ease with which the anchor member may be pushed onto the ground its head 40 tapers in thickness in passing from its root to its apex.

Figure 3:
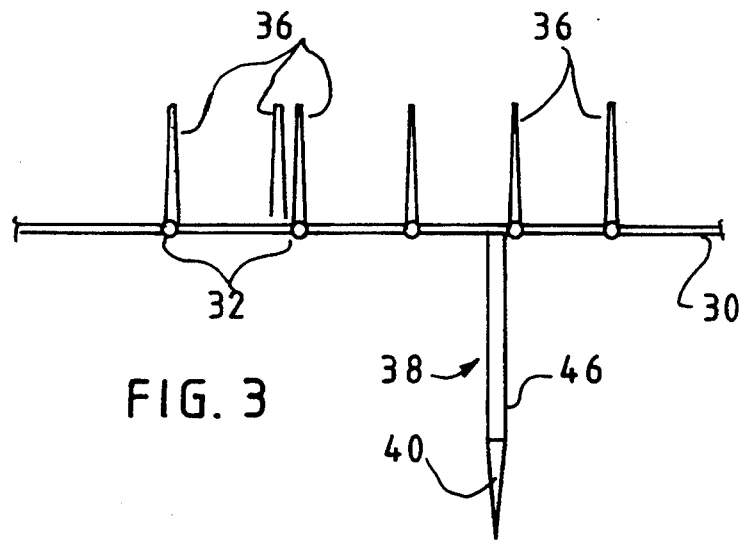
FIG. 3 is a side view of the device of FIG. 2 showing an anchor member thereof in an operable position.

The hinge formation 42 by which the anchor member is attached to the part 30' of a member 30 of the lattice or grid may take any suitable form however, that form shown in the drawings is preferred where the hinge is provided as a pair of notches 50 in the side edge beads 46 which allow the anchor member readily to flex thereby enabling the anchor member to move from the position shown in FIG. 2 (lying in the plane of the lattice or grid) to the position shown in FIG. 3 (in which it extends normally of that plane).

Desirably the dimensions of the spike formations 36 are, as noted, substantially the same as the spacing of the elongate members 30 and 32—preferably in the range of 1.00 to 2.00 cm.

As can be seen from the drawing the anchor member 38 is of greater length of between 3.00 and 6.00 cm such that it will extend for a significant extent into any surface on which the deterrent device is placed.

It will be appreciated that due to the particular shape of the head 40 of the anchor member 38 the anchor members will firmly hold the deterrent device in place when it is pushed into soil.

The upstanding spike formations 18 (the device of FIG. 1) and 36 (the device of FIGS. 2 to 5) are sufficiently sharp and extend upwardly for a sufficient extent to make it uncomfortable for feral or domestic animal—especially a cat in the act of defecation—to stand where the deterrent device is placed.

However, these spike formations are sufficiently flexible and insufficiently sharp to cause injury to an animal or person who may inadvertently fall on them or walk on them.

When, either device is manufactured of a low density polyethene spike formations 18 or 36 which are approximately 2.00 cm long, about 2.00 mm in diameter at the lattice or grid and which taper slightly towards their outermost ends are found to be satisfactory.

As can be seen from the Figures the irregularly undulating or sinuous members 12 and 14 or 30 and 32, are non parallel and it is believed this decreases the visual obtrusiveness of the deterrent device when it is positioned.

For the same purpose the devices are preferably colored green and/or brown.

Whilst it is less preferred it will of cause be appreciated that the members 30 and 32 may, if desired, be made regular and straight in form.

The open nature of the lattice or grid, of the devices shown will allow any plant material to grow through then—that is to say the growth of plants protected by the device will not be hindered by the devices.

The device shown in FIG. 2 is preferably a unit device comprising one quarter of a piece made in a single moulding operation which is thereafter cut or broken along the edges to provide the unit device shown.

It will be appreciated that device illustrated in FIG. 2 may form merely a part of a larger device having a plurality of anchor members depending therefrom.

Devices embodying the invention may be provided in any shape or form which is desirable—that is to say in groups of four, eight, sixteen or more of the unit devices shown in the Figures.

One particularly advantageous arrangement embodying the invention provides a device of indeterminate length but of a width which is in multiply of the width (e.g. twice) of the devices shown in FIGS. 1 and 2. In this way means for deterring animals may be sold as a roll for use in protecting extended areas or from which a desired length may be cut by a user to suit a particular application.

Furthermore, the devices described are not limited to the particular sizes noted but may be made smaller or larger to act as deterrents not only for cats, dogs and the like but also for other animals. An arrangement as described but produced on a smaller scale has for example been found to be effective in deterring snails and slugs from approaching a protected area.

It will be appreciated that many modifications may be made to the arrangements described without departing from the invention which provides a device which is visually unobtrusive, environmentally inert and which is operable to prevent domestic and feral animals approaching an area protected by the device.

We claim:

1. An animal deterrent device for mounting on the ground, which is of molded plastics material and has first and second pluralities of elongate members which run generally orthogonally of one another and intersect to form an open grid, flexible spike formations formed integrally with the grid and extending generally normally from one side of the open grid and at least one anchor member formed integrally with the grid in the plane of the grid and which is movable to a position in which it extends generally normally away from that side of the grid opposed to said one side thereof, allowing the anchor member to be driven into the ground to hold the deterrent device thereon.

2. The device according to claim 1, wherein each anchor member has a triangular or barbed end.

3. The device according to claim 2, wherein the length of each anchor member is greater than the length of the spike formations.

4. The device according to claim 3, wherein the length of each anchor member is at least three times greater than the length of the spike formations.

5. The device according to claim 1, wherein the anchor members and spike formations are moulded in the piece with the open grid as the open grid is made from low density polyethylene.

6. The device according to claim 5, wherein said anchor members are formed to extend from parts of ones of said first or second pluralities of members.

7. The device according to claim 5, wherein each anchor member is coupled to parts of ones of said first or said second pluralities of members by a hinge mechanism and to others of said members by readily rupturable webs.

8. The device according to claim 7, wherein each anchor member has the form of a broad arrow, side edges of which are beads interconnected by a central web significantly thinner than said beads.

9. The device according to claim 8, wherein said readily rupturable web connections of the or each of said anchor member to the elongate members of said first and second pluralities of members is provided at the vertices of the triangular or barbed head of the anchor member.

10. The device according to claim 9, wherein each head of the anchor member tapers in thickness in section.

11. The device according to claim 10, wherein the length of each the anchor member is greater than the spacing of individual ones of said first or second pluralities of members.

12. The device according to claim 11, wherein spike formations are provided located at the intersections of ones of the first and second pluralities of elongate members.

* * * * *